March 10, 1970 V. V. BOGDANOV ET AL 3,499,318
APPARATUS FOR DETERMINING THE TOUGHNESS OF ABRASIVE ARTICLES
Filed March 6, 1967 3 Sheets-Sheet 1

March 10, 1970  V. V. BOGDANOV ET AL  3,499,318
APPARATUS FOR DETERMINING THE TOUGHNESS OF ABRASIVE ARTICLES
Filed March 6, 1967  3 Sheets-Sheet 3

United States Patent Office 3,499,318
Patented Mar. 10, 1970

3,499,318
APPARATUS FOR DETERMINING THE TOUGHNESS OF ABRASIVE ARTICLES
Vladimir Vladimirovich Bogdanov, ul. Pestelya, 8/36, kv. 2; Boris Aronovich Glagovsky, Farforovskaya ul. 4, kv. 24; Igor Borisovich Moskovenko, Kirovsky pr., 50, kv. 6; Evgeny Vasilievich Nesmashny, ul. Gertsena 11/6, kv. 29; Evgeny Dmitrievich Pigulevsky, Vitebsky pr., 21, korp. 4, kv. 38; and Vladimir Alexeevich Rybakov, Nevsky pr., 114, kv. 59, all of Leningrad, U.S.S.R.
Filed Mar. 6, 1967, Ser. No. 620,960
Int. Cl. G01m 7/00
U.S. Cl. 73—67.2                    4 Claims

ABSTRACT OF THE DISCLOSURE

Apparatus for determining the toughness of abrasive articles, such as grinding wheels, utilizing a piezoelectric oscillation emitter which is excited by an electrical oscillator and is provided with a contact element for transmitting mechanical oscillations from the contact element to the sample being tested. A receiving member is provided which is similar to the emitter and has a contact element adapted to engage the test sample to sense mechanical oscillations thereof and convert them into electrical oscillations. The latter oscillations are transmitted to a resonance indicator. A calibrating table provides the toughness indication corresponding to the frequency of resonance of the mechanical oscillations; that is, for the maximum vibration amplitude frequency.

The present invention relates to apparatus for determining the toughness of abrasive articles.

Known in the art are apparatus based mostly upon the principle of mechanical destruction of the test area of the abrasive article with the subsequent measurement of the resulting strain which is indicative of the toughness of the abrasive article under test.

The aforementioned apparatus allow the toughness of only the test area (i.e. the destructed one) to be judged, not that of the test abrasive article as a whole; offer no possibility of testing repeatedly one and the same area of the test abrasive article; deface the finished tested article since a dent is left on the surface thereof; make no provision for testing open-grained abrasive wheels less than 50 mm in diameter, as in this case the area destroyed during the test approximates the entire size of the abrasive article being tested, on which account the latter is not suitable for use after testing.

There are also known apparatus for determining the toughness of abrasive articles employing a dynamic method, according to which parameters characteristic of elastic properties of the test article, such as the frequency of natural virbations, are measured, said apparatus employing the principle whereby elastic waves are excited in the test article whose frequency can be varied within a substantially wide range, with the subsequent finding of one of the elastic parameters of the article, e.g. the frequency of natural vibrations thereof which is indicative of the toughness of the abrasive article. (cf. U.S. Patent No. 2,486,984, Cl. 73–67).

The apparatus of the aforesaid character comprises essentially an oscillator capable of generating electrical oscillations whose frequency can be varied within a substantially wide range; an electric vibrating device capable of converting electrical oscillations produced by the oscillator into mechanical oscillations and transmitting these to the test abrasive article; vibration detecting means capable of picking up mechanical oscillations from the test article and converting them into electrical oscillations; an amplifier of the signal of said vibration detecting means; a resonance indicator and special supports for mounting the abrasive article being tested.

The vibrating device of the apparatus is in the form of a converter of electrical oscillations into mechanical ones and a stylus connected to said converter and capable of contacting the test article, thereby exciting mechanical oscillations therein.

The vibration detecting means is essentially a converter of mechanical oscillations into electrical ones which is close to the specimen but out of contact with it.

The principal disadvantage of the aforementioned device resides in that it gives no possibility of testing small-size abrasive articles which is primarily due to the fact that the vibration detecting means is out of contact with the abrasive article under test. Such an arrangement necessitates producing of oscillations with a great amplitude which results in loss of stability of the specimen on the supports due to a comparatively small mass thereof; this, in turn, adversely affects the testing procedure.

This disadvantage in apparatus of the aforesaid character, such as those of the "Sonic Comparator" type, manufactured by the Saturn Electronics Company (U.S.A.), in practice, permits the testing only of abrasive wheels over 70 mm. in diameter.

As it can be seen from the foregoing considerations, the prior art apparatus are incapable of testing abrasive articles less than 50 mm. in diameter.

It is an object of the present invention to provide an apparatus for determining the toughness of abrasive articles which will be applicable for abrasives within a wide range of sizes and types thereof.

It is another object of the present invention to provide an apparatus of the character set forth hereinabove which will be applicable especially for small-size abrasives less than 50 mm. in diameter.

It is also an important object of the present invention to provide such an apparatus that will feature a simpler construction as compared to the known apparatus of similar character.

In keeping with said and other objects of the invention, the herein proposed device comprises: an oscillator capable of generating electrical oscillations of frequencies varying over an appreciable range; an emitting device capable of converting the electrical oscillations produced by the said oscillator into mechanical oscillations and transmitting these to the specimen; a receiving device capable of detecting the mechanical vibration of the test article and converting them into electrical oscillations; an amplifier of the signal of said receiving device; and a resonance indicator of the mechanical oscillations. In accordance with the invention, both said emitting device and said receiving device are made as piezoelectric devices arranged oppositely and contacting the article under test.

Either of the aforesaid piezoelectric devices is desirably equipped with a dome-shaped element with which it contacts the test abrasive.

Such a design of the herein proposed apparatus enables it to be used for measuring the toughness of abrasive articles of various sizes and types, especially small-size ones with a diameter less than 50 mm.

An embodiment of the present invention is described hereinbelow by way of example with reference to the accompanying drawings, wherein.

Figure 3:
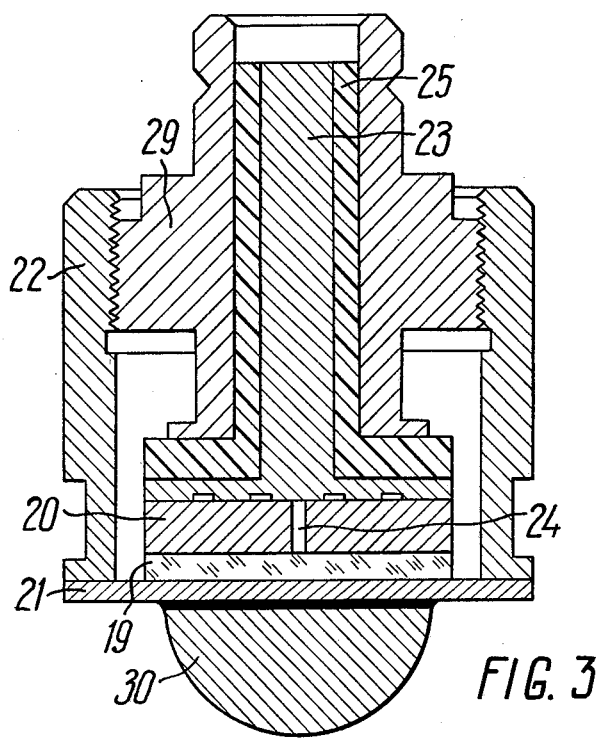
FIG. 3 is an axial section through the piezoelectric device of the apparatus according to the invention.

Referring to the drawings, the apparatus for determining the toughness of abrasive articles comprises an oscillator 1 (FIGS. 1 and 2) capable of generating electrical oscillations of frequencies varying over the range of 50 to 150 kc./s. required for testing small-size abrasives less than 100 mm. in diameter; an emitting device 2 capable of converting the electrical oscillations of the oscillator 1 into mechanical ones and transmitting them to an abrasive article 3 under test; a receiving device 4 capable of detecting said mechanical oscillations in the test abrasive and converting them into electrical oscillations; an amplifier 5 of the signal of said receiving device 4; a resonance indicator 6; matching stages 7 and a stabilized power source consisting of a power transformer 8, a full-wave rectifier with a filter 9 and an electronic voltage stabilizer 10. The filament circuits of the tubes of the electronic voltage stabilizer 10 denoted as *ab* and *cd*, as well those of all other tubes of the apparatus, denoted as *eg*, are supplied from filament transformers 11 and 12, respectively, and connected to the respective terminals $a'$, $b'$, $c'$, $d'$, $e'$, and $g'$.

The oscillator 1 is made as a separate unit whereby the apparatus is made much more versatile, since for testing large-size abrasive articles with a diameter in excess of 100 mm., the oscillator can be replaced by another one possessing the appropriate frequency range.

The oscillator 1 is essentially a conventional RC-oscillator employing a Wien bridge in the positive feedback circuit thereof.

The frequency of oscillations generated by the oscillator 1 can be adjusted within the specified range by varying the two-gang capacitor through its knob provided with a reading dial 13. To stabilize the amplitude of oscillations of the oscillator 1 within the specified frequency range use is made of a negative feedback coupling with a non-linear element i.e. a thermistor 14.

Cathode followers based on tubes 15, 16 and made as a separate unit 7 are provided for matching the oscillator 1 output with the emitting device 2 and the resonance indicator 6, respectively. A potentiometer 17 is the load of the cathode follower employing the tube 15; the knob 17' of the potentiometer is brought onto the front panel, said potentiometer being capable of regulating the voltage supplied via a high frequency connector 18 to the transducer 2.

The emitter 2 and receiver 4 are essentially piezoelectric devices of similar design. The principal element of the piezoelectric device (whose axial section appears in FIG. 3) is a piezoelectric crystal plate 19 buffered with a cardboard damper 20. The piezoelectric crystal plate 19 is soldered to a steel bottompiece 21 of the device which serves as one of the electrodes of said plate 19 and is solidly connected to a body 22. The other electrode 23 of the piezoelectric crystal plate 19 whose electric contact with the surface of said plate is effected through a metal connector 24, is insulated from the body 22 by a bushing 25 and through connectors (not illustrated in the drawings) built-in into a measuring frame 26 (FIG. 1) said electrode 23 is connected to the central conductor of interconnecting coaxial cables 27 and 28, respectively, for the devices 4 and 2.

For convenience in assembly the piezoelectric device cover, i.e. a bushing 29, is provided with threaded engagement with the body 22.

The bottompiece 21 of either of the piezoelectric devices is provided with a dome-shaped element 30 with which the device contacts the test abrasive.

A hemisphere made from tempered steel is used as the dome-shaped element 30 of the apparatus of the present invention.

The measuring frame 26 provides for vertical movement of the upper receiving device 4 mounted coaxially and oppositely to the lower emitting device 2 so that articles of different sizes can be fixed in position therebetween; provision is likewise made in said frame for a spring actuator 31 capable of resiliently biasing the emitting device 2 upwards and being displaceable downwardly against the spring bias whereby the abrasives of the same size can be replaced quickly.

The piezoelectric receiving device 4 is connected through the coaxial cable 27 and a high frequency connector 32 to the input of the amplifier 5 (FIG. 2) of the signal picked up by the receiving device 4, said amplifier being essentially a three-stage amplifier with a pass-band, corresponding to the frequency range of the oscillator 1 and a gain factor of the order of 250,000.

To reduce the adverse effect of noises on the operation of the apparatus, a pentode with low inherent noise level is employed as the tube of a first stage 33. To avoid any possibility of self-excitation for the amplifier 5 and with the purpose of flattening the response characteristic thereof, negative feedbacks 34 and 35 are provided. A cathode follower employing a tube 36 is provided at the amplifier 5 output, said follower serving to match said output with the input of the resonance indicator 6.

The resonance indicator 6 is made likewise as a separate unit and comprises an amplitude-resonance indicator based on a tube 37, whereto a signal from the output of the amplifier unit 5 is delivered, and a phase-resonance indicator capable of catching a resonance either by coincident or by inverted phases of a signal at the oscillator 1 and the amplifier 5 outputs.

The phase-resonance indicator uses two double diodes 38 and 39 to one of which 38 there is delivered a comparison signal from the oscillator 1 output through the cathode follower based on the tube 16, whereas the other double diode 39 receives a signal from the amplifier 5 output through the cathode follower based on the tube 36.

Phase coincidence is indicated by the maximum and phase opposition by the minimum value read by a pointer instrument 40. Phase coincidence or phase opposition determined by the relationship between the size of the test abrasive and the resonance frequency are both indicative that a resonance has occurred.

All the remaining components used in the apparatus are of conventional design, feature no additional particularities and therefore need no further elucidation.

The determination of the toughness of abrasive articles with the help of the present apparatus is effected as follows.

The abrasive article 3 (FIG. 1) whose toughness is to be determined, is positioned between two hemispheres, i.e. the dome-shaped elements 30 of the emitting device 2 and receiving device 4 where it is held in place with a light pressure exerted thereupon by the spring actuator 31.

Figure 4:
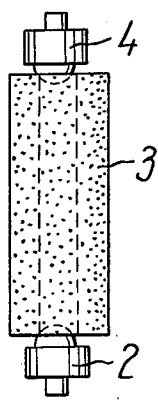
FIGS. 4 to 9 illustrate the most practicable modes of positioning the test abrasive between the piezoelectric devices.
Figure 5:
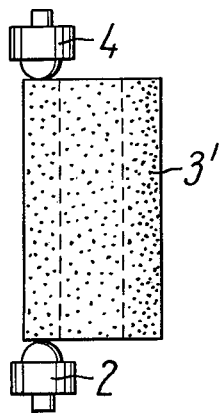
Figure 6:
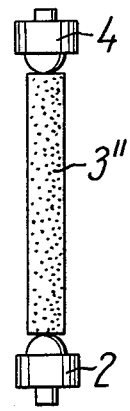
Figure 7:
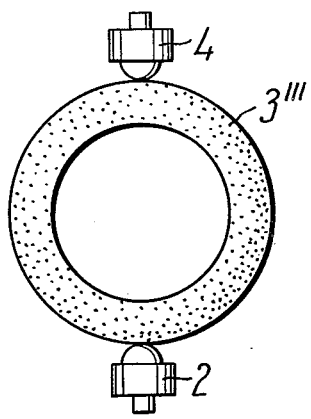
Figure 8:
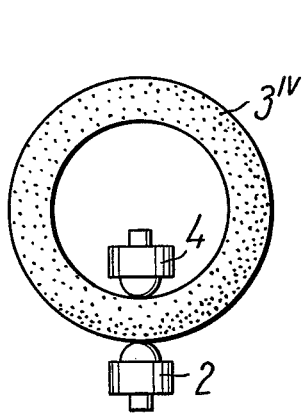
Figure 9:
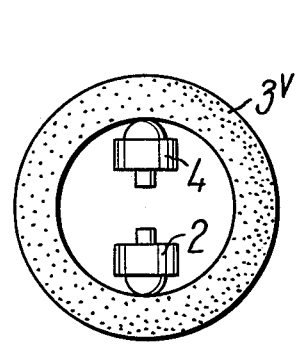

Represented in FIGS. 4 to 9 are the most frequently applied modes of holding the abrasive articles 3, $3^I$–$3^V$ of different sizes and shapes. In the case where the thickness of the test grinding wheel exceeds its diameter, as well as with test abrasive sticks of different thicknesses, the abrasives under test are preferably held as illustrated in FIGS. 4, 5 and 6. Should, on the contrary, the diameter of the test grinding wheels exceed their thickness, the method of holding the test abrasive shown in FIG. 7 will be found effective. The modes of holding the test abrasive illustrated in FIGS. 8 and 9 are usually applicable when testing large-sized grinding wheels whereby the opposed sides of the wheels are engaged by the transducers as shown for supporting the wheels, has been inserted, a certain modification of the support frame being in such cases involved inevitably.

The application of the aforementioned methods of fixing the test abrasives avoids any need in special stands or arrangements or fixtures for holding them in place, and makes it possible to provide an apparatus for determining the toughness of abrasive articles that is reliable in operation and convenient in service.

Transmission and reception of mechanical oscillations are effected as follows.

Electrical oscillations generated by the oscillator 1 are delivered through the cathode follower based upon the tube 15 to the piezoelectric emitting device 2 which converts said electrical oscillations into mechanical oscillations of same frequency and transmits these through its dome-shaped element 30 to the test article 3.

The mechanical oscillations thus obtained are sensed by the piezoelectric receiving device 4 through the dome-shaped element 30 thereof likewise contacting the test article, whereupon these oscillations are reconverted into electrical ones.

The immediate contact of the emitting device 2 and the receiving device 4 with the specimen 3 enables the dependable acoustic coupling therebetween, which, in turn, makes it possible to reduce the necessary amplitude of oscillations produced by the emitting device 2. This allows the similar piezoelectric devices to be utilized as the emitting and receiving devices.

The use of the dome-shaped elements 30 effecting the contact of the emitting and receiving devices with the test articles ensures good propagation of oscillations from the emitting device to the test abrasive article and from the article to the receiving device, makes it possible to contact the specimen at a small area thereof which contributes to the separating of a fundamental mode of vibration of the test abrasive and the cancellation of spurious modes of vibration. The fundamental mode of vibration is assumed to be such a mode of vibration induced in the test abrasive under which, within a given frequency range, the amplitude of the resonance obtained reaches its maximum value. For slender abrasive articles possessing high length-to-breadth ratio the fundamental mode of vibration is, as a rule, the mode of longitudinal length vibration, whereas for abrasives such as grinding wheels with small thickness the fundamental mode of vibration is, as a rule, the radial mode of vibration.

The separation of the fundamental mode of vibration effected by the dome-shaped elements is of particular importance when testing small-sized articles wherein the longitudinal and lateral dimensions are nearly equal which leads to a great many of various modes of vibration with resonant frequencies close to one another; as a result, a possibility arises of transition from one mode of vibration to another when measuring a resonant frequency and, consequently, of an erroneous reading. The employment of the aforesaid dome-shaped elements precludes such errors.

Amplification of the picked up signals and registering of a resonance are effected as follows.

Electrical oscillations from the receiving device 4 are delivered to the amplifier 5 of the receiving device signal from whose output the amplified signal arrives at the amplitude-resonance indicator based upon the tube 37 and the phase-resonance indicator based upon the tubes 38, 39. At the same time a comparison signal arrives at the phase-resonance indicator from the oscillator 1 output through the cathode follower employing the tube 16.

Then by rotating the knob provided with the reading dial 13 the frequency of oscillations generated by the oscillator 1 is varied so as to fall into resonance which is judged by the maximum widening of the blind sector of the "magic eye" tube 37 of the amplitude-resonance indicator, and more precisely, by the pointer instrument 40 of the phase-resonance indicator.

Figure 1:
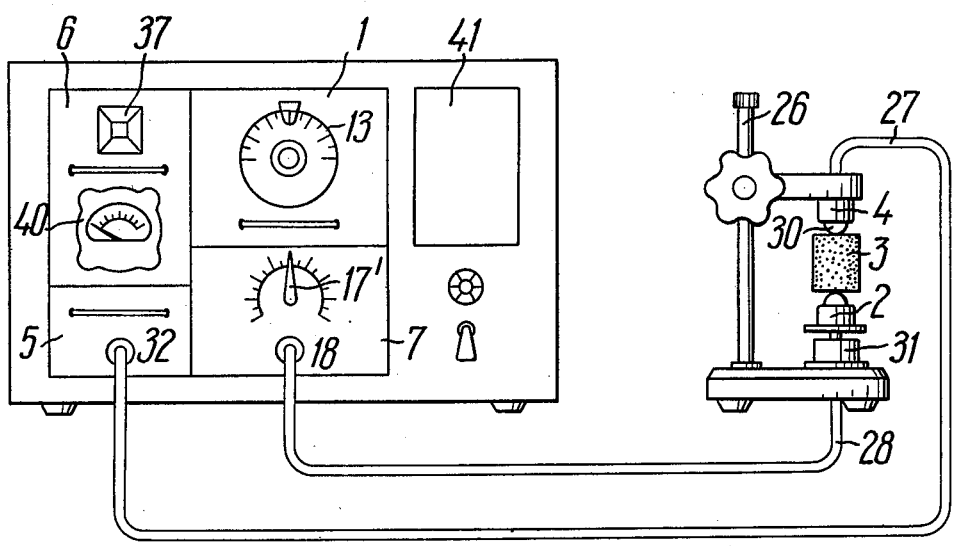
FIG. 1 is a general diagrammatic view of the apparatus of the present invention.
Figure 2:
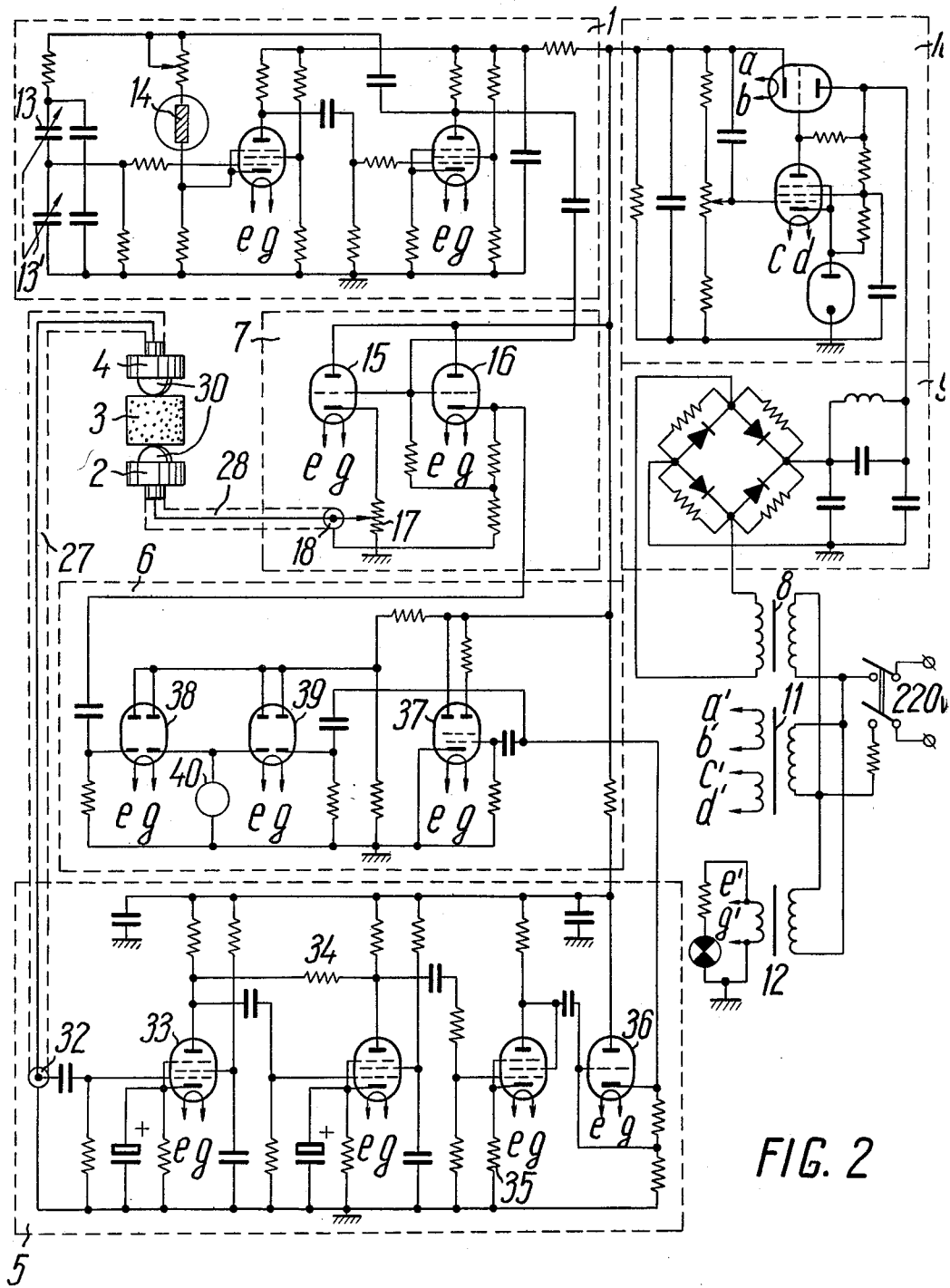
FIG. 2 is a wiring diagram of the apparatus of the present invention.

The resonance having been obtained, its frequency is read off the dial 13 scale whereupon the toughness of the test abrasive article is found in a calibrating table 41 (FIG. 1).

What is claimed is:

1. An apparatus for determining the toughness of abrasive articles of a size on the order of 50 mm. or less, comprising: an electrical oscillation generator capable of varying the frequency of generated oscillations over a wide range; an emitter transducer capable of converting electrical oscillations into corresponding mechanical oscillations; means connecting said electrical oscillation generator to energize said emitter transducer; said emitter transducer comprising a piezoelectric device with a direct contact sensor for contacting an abrasive article under test and transmitting its mechanical oscillations thereto; a receiver transducer capable of sensing mechanical oscillations and converting such sensed oscillations into electrical oscillations; said receiver transducer comprising another piezoelectric device with a direct contact sensor mounted for contacting the abrasive article under test on the opposite side thereof from said emitter and for converting mechanical oscillations received from said test article into corresponding electrical oscillations; means for supporting said emitter and receiver transducers in adjustably spaced position whereby opposed sides of the abrasive article may be engaged by and the article supported solely by the transducers; and means connected to receive said electrical oscillations from said receiver transducer and including a resonance indicator of said latter oscillations.

2. An apparatus as claimed in claim 1, wherein each of said piezoelectric sensor devices comprises a dome-shaped element with which said piezoelectric devices contact the abrasive article under test.

3. An apparatus as defined in claim 1 wherein said transducer supporting means comprises an adjustable clamp frame for placing said emitter and receiver transducer sensors in engagement with opposite sides of the article under test.

4. An apparatus as defined in claim 3, wherein said emitter transducer sensor is resiliently mounted and biased for engagement with the test article.

References Cited

UNITED STATES PATENTS

| | | | |
|---|---|---|---|
| 2,486,984 | 11/1949 | Rowe | 73—67.2 |
| 3,306,100 | 2/1967 | Wilhelm et al. | 73—67.2 |
| 3,355,933 | 12/1967 | Rowe | 73—67.2 |

FOREIGN PATENTS

| | | |
|---|---|---|
| 119,003 | 11/1959 | U.S.S.R. |
| 523,028 | 4/1955 | Italy. |

JAMES J. GILL, Primary Examiner

JOHN P. BEAUCHAMP, Assistant Examiner